United States Patent Office 2,851,494
Patented Sept. 9, 1958

2,851,494
NEW α-AMINO-β-HYDROXYCARBOXYLIC ACID AMIDES AND A PROCESS OF PREPARING THEM

Gustav Ehrhart, Bad Soden (Taunus), Heinrich Ott, Eppstein (Taunus), and Ernst Lindner, Frankfurt am Main, Germany, assignors to Farbwerke Hoechst Aktiengesellschaft vormals Meister Lucius & Brüning, Frankfurt am Main, Germany, a corporation of Germany No Drawing. Application February 28, 1956
Serial No. 568,197

Claims priority, application Germany March 4, 1955

5 Claims. (Cl. 260—562)

The present invention relates to new α-amino-β-hydroxy-carboxylic acid amides and acid addition salts thereof and a process of preparing these compounds.

It is known that para-phenetidides from α-amino-carboxylic acids, for instance N-acetyl-glycine-para-phenetidide or glycine-para-phenetidide or their salicylic acid salts show antipyretic and antineuralgic properties.

Now, we have found that α-amino-β-hydroxy carboxylic acid amides of the general formula

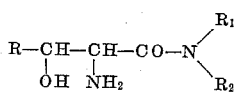

wherein R represents an alkyl radical containing at most 4 carbon atoms or a phenyl radical, $R_1$ represents a hydrogen atom or an alkyl radical containing at most 4 carbon atoms, $R_2$ represents a phenyl radical, if desired substituted by a alkoxy radical of low molecular weight or a carbalkoxy group of low molecular weight, and wherein $R_1$ and $R_2$ together with the nitrogen atom linked may form members of a saturated heterocyclic ring system—and acid addition salts thereof, in addition to antiphlogistic and antipyretic properties, show an extraordinarily good analgesic efficiency at a relatively low toxicity and that such compounds can be prepared by treating compounds of the general formula

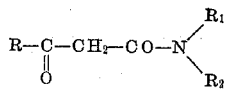

wherein R, $R_1$ and $R_2$ have the meaning mentioned above, with nitrous acid and reducing in the products treated with nitrous acid the isonitroso group and the keto group.

As starting substances for the process according to the invention there come into consideration compounds of the above-mentioned formula wherein R, $R_1$ and $R_2$ have the above-mentioned meaning. There are particularly suitable compounds of the above-mentioned formula wherein R represents a methyl group and $R_2$ represents a phenyl radical substituted in para-position by a alkoxy group of low molecular weight, or wherein the nitrogen atom of the amino group is a member of a saturated heterocyclic ring system.

There are mentioned, for instance, the following compounds: acetoacetic acid-para-phenetidide, benzoylacetic acid-para-phenetidide, acetoacetic acid-analide, acetoacetic acid-para-anisidide, para-nitro-benzoylacetic acid para-phenetidide, m-hydroxy-benzoylacetic, acid-p-phenetidide, o-methoxy-benzoyl-acetic acid-p-phenetidide, acetoacetic acid-N-methyl-p-phenetidide, benzoylacetic acid-N-ethyl-p-phenetidide, acetoacetic acid-N-isobutyl-p-anilide, acetoacetic acid-N-butyl-p-anisidide, m-hydroxy-benzoylacetic acid-N-n-propyl-p-phenetidide, o-methoxy-benzoylacetic acid-N-isopropyl-p-phenetidide, acetoacetic acid-piperidide, acetoacetic acid-1:2:3:4-tetrahydroquinolide, acetoacetic acid-1:2:3:4-tetrahydro-6-hydroxy-quinolide, acetoacetic acid-1:2:3:4-tetrahydro-6-methoxy-quinolide, acetoacetic acid-morpholide, acetoacetic acid-pyrrolidide, acetoacetic acid-4-phenyl-4-carbethoxy-piperidide, acetoacetic acid-picolide (α, β, γ), acetoacetic acid-thiazolidide, acetoacetic acid-decahydro-quinolide, acetoacetic acid-6-isobutoxy-1:2:3:4-tetrahydroquinolide, acetoacetic acid-decahydro-iso-quinolide, acetoacetic acid-1:2:3:4-tetrahydro-iso-quinolide, acetoacetic acid-p-carbethoxy-anilide, acetoacetic acid-p-carbomethoxy-anilide, acetoacetic acid-o-carbethoxy-anilide, benzoylacetic acid-(N-methyl)-p-carbethoxy-anilide, acetoacetic acid-(N-ethyl)-p-carbomethoxy-anilide, p-methoxy-benzoylacetic acid-(N-methyl)-p-carbethoxy-anilide, acetoacetic acid-(N-butyl)-p-carbomethoxy-anilide, acetoacetic acid-(N-propyl)-p-carbomethoxy-anilide.

The compounds used as starting materials can be prepared according to the methods described in the examples. (Cf. also "Beilstein" (forth edition), 1st supplement, volume 13, page 177.)

The conversion of the starting substances into the α-isonitroso compounds can be effected in known manner by treatment of the carbon atom in α-position with nitrous acid. It is advantageous to dissolve the β-ketocarboxylic acid amide in glacial acetic acid and to introduce the nitroso group by means of addition of a concentrated aqueous solution of sodium nitrite. It is also possible to dissolve the β-ketocarboxylic acid amide in an organic solvent and to introduce the nitroso group with addition of sodium nitrite and mineral acids. As organic solvents there enter into consideration, for instance, lower aliphatic alcohols, especially methanol. As mineral acids there are preferably used sulfuric acid or hydrochloric acid.

The reduction of the isonitroso group in α-position according to the process in question can be carried out simultaneously with the reduction of the keto group in a single operation. For instance, the reduction can be carried out catalytically by means of metals of the 8th group of the periodical system, preferably by means of nickel catalysts. For instance, precious metals or Raney catalysts can also be applied. As solvents there can be used organic solvents, preferably lower aliphatic alcohols, if necessary in the presence of water. It is useful to operate at room temperature or at a moderately elevated temperature, preferably between 50° C. and 100° C. Furthermore, it is possible to carry out the reduction by means of nascent hydrogen, e. g. from sodium amalgam or aluminum amalgam and alcohol or by means of lithium-aluminum hydride or sodium-boron-hydride. The reduction can also be carried out electrolytically. After elimination of the catalyst, the desired α-amino-β-hydroxy-carboxylic acid amide is directly obtained.

The method of operation described below which can be effected with good yields equally represents an advantageous form of realizing the process for converting the isonitroso compounds which are formed as intermediate products into the α-amino-β-hydroxy-carboxylic acid amides. When operating according to this method, the isonitroso compounds are at first treated with reducing agents in such a manner that only the isonitroso group is converted into an amino group. As reducing agents there may be mentioned: nascent hydrogen which can be obtained, for instance, from base metals such as zinc, iron or tin, in the presence of dilute acids. Sodium hydrosulfite or stannous chloride may also serve as reducing agents.

The reduction of the keto group in the α-amino-β-keto compounds in order to obtain the secondary alcohol group is in this case subsequently carried out in a special reaction. In this connection it may be advantageous to protect the amino group in α-position intermediately by acylation. As acylating agents there are mentioned acid derivatives, for instance acid halides and acid anhydrides, e. g. acetyl chloride, propionyl chloride, benzoyl chloride, phenylacetic acid chloride or the corresponding acid anhydrides, particularly acetic anhydride and phenylacetic chloride. When operating in this manner it is not necessary to isolate the α-amino compounds which are formed intermediarily. The acylating agent can then be added immediately after the reduction of the isonitroso compound is finished. When nascent hydrogen set free from base metals by means of an acid is used as reducing agent, it is useful to neutralize the solution with sodium acetate before adding the acylating agent.

The reduction of the keto group can be carried out, for instance, by means of sodium amalgam or aluminum amalgam in the presence of alcohols. It is also possible to operate with lithium-aluminum hydride or sodium boron hydride as well as electrolytically. Catalytic hydrogenation can be carried out with particular success by using, for instance, catalysts of the 8th group of the periodic system, preferably nickel catalysts; it is also of advantage to use Raney catalysts. As solvents there can be used organic solvents, preferably lower aliphatic alcohols, if necessary in the presence of water. It is suitable to operate at room temperature or at moderately elevated temperatures, preferably between 50° C. and 100° C.

The separation of the acyl group in the α-acylamino-β-hydroxy carboxylic acid amides can be effected according to the usual methods, for instance by hydrolysis with dilute mineral acids, preferably with hydrohalic acids, especially hydrochloric acid or hydrobromic acid.

According to the method described at last it is possible also to operate without isolation of the α-isonitroso-β-keto-carboxylic acid amides, by introducing the nitroso group by means of sodium nitrite, in the presence of acids, into the starting compounds as described above and directly reducing the reaction mixture obtained. By adding the acylating agent after the reduction is finished, the α-acylamino-β-keto-carboxylic acid amide is immediately obtained in this case.

The compounds obtained can be converted into the corresponding salts by reaction with inorganic and organic acids. As inorganic acids there come into consideration, for instance, hydrohalic acids such as hydrochloric acid and hydrobromic acid, sulfuric acid, phosphoric acid and amino-sulfonic acid.

As organic acids there may be mentioned, for instance: formic acid, acetic acid, oxalic acid, malonic acid, succinic acid, maleic acid, lactic acid, malic acid, tartaric acid, citric acid, hydroxy-ethane sulfonic acid, aceturic acid, ethylene diamine tetracetic acid, benzoic acid and salicylic acid, as well as their derivatives, or phenyldimethylpyrazolonemethylaminomethane sulfonic acid.

The compounds obtained according to the process of the present invention represent valuable medicaments a great number of which, in addition to reduced toxicity, show antiphlogistic, antipyretic and analgesic efficiency and, moreover, contain a sedative component.

As regards efficiency, they are superior to known compounds, e. g. the derivatives of glycine-p-phenetidide and the N-acetyl-para-phenetidide. The toxicity of the products is considerably reduced in comparison with the known compounds. The analgesic efficiency, for instance, of the α-amino-β-hydroxy-butyric acid-6-methoxy-1:2:3:4-tetrahydro-quinolide is stronger than that of the known N-acetyl-p-phenetidine whereas, for instance, the α-amino-β-hydroxybutyric acid-para-phenetidide is characterized by a strong antiphlogistic efficiency of extraordinarily long duration at the aerosil test applied at the rat as well as at the allergic conjunctivitis at the rabbit.

Another considerable advantage of the compounds obtained according to the process of the present invention consists in its easier solubility. A part of the α-amino-β-hydroxy-butyric acid - 6 - methoxy-1:2:3:4-tetrahydro-quinolide is readily soluble at room temperature in 10 parts of water, whereas the known compound is to be considered as practically insoluble in water and only 1 part of the known N-acetyl-glycine-p-phenetidide-hydrochloride is soluble in 20 parts of water. The advantage connected therewith which, moreover, is accompanied by an improved resorption power, is of special importance for the parenteral application of the compounds obtained by the process of the invention.

The following examples serve to illustrate the invention, but they are not intended to limit it thereto, the parts being by weight unless otherwise stated.

*Example 1*

255 parts by volume of glacial acetic acid are poured onto 127.5 parts of acetoacetic acid-p-phenetidide and a concentrated aqueous solution of 45 grams of sodium nitrite is added in several portions, while stirring. It is useful to cool the mixture from time to time. After about 15 minutes this solution is introduced into a mixture of 1.5 kg. of ice and 270 cc. of concentrated sulfuric acid. The isonitroso compound formed precipitates thereby. After the addition of 120 g. of zinc dust to the reaction mixture and stirring the whole for 1 hour, nearly complete dissolution sets in. During the reduction the reaction temperature is maintained at +10° C.; the zinc sludge is filtered with suction and the clear filtrate is diluted by means of 540 grams of sodium acetate and 90 grams of phenyl-acetic acid chloride, while stirring vigorously. After a reaction period of about 15 minutes the reaction mixture is filtered with suction, washed with water, the precipitate is made into a paste by means of a little methanol and again filtered with suction. 102 grams of α-phenacetylamino-acetoacetic acid-p-phenetidide are obtained, which, after recrystallization from ethyl alcohol, have a melting point of 181–182° C.

102 grams of this compound, suspended in 2200 cc. of aqueous methanol, are hydrogenated at about 50° C. in the presence of Raney nickel serving as catalyst. After cooling, the grey crystal magma obtained is boiled out several times with methanol and freed from the catalyst by filtering with suction. After cooling, the α-phenacetyl-amino-β-hydroxy-butyric acid-p-phenetidide melting at 222–223° C. is obtained from the filtrate in nearly theoretical yield.

20 grams of this compound are boiled for 45 minutes under reflux with 50 cc. of n-propyl alcohol, 50 cc. of concentrated hydrochloric acid and 50 cc. of water. In order to eliminate the propyl alcohol, the clear solution obtained is concentrated to half of its volume and rendered alkaline by means of concentrated alkali hydroxide solution. After cooling, 11 grams of α-amino-β-hydroxy-butyric acid-p-phenetidide are obtained which, after recrystallization from water, have a melting point of 114–115° C.

From the above α-amino-β-hydroxy-butyric acid-p-phenetidide the hydrochloride can be obtained by adding the theoretical quantity of 2 n-hydrochloric acid, filtering the solution by means of charcoal, evaporating it to dryness, under reduced pressure, dissolving the remaining residue in hot alcohol, and precipitating it with ether. The hydrochloride which is readily soluble in water melts at 161–162° C.

The reduction of α-phenacetylamino-acetoacetic acid-p-phenetidide to α-phenacetylamino-β-hydroxy-butyric acid-p-phenetidide can also be effected by suspending 100 grams of the compound in 2000 cc. of aqueous methanol and hydrogenating it, at 120° C., by means of a nickel catalyst applied on kieselguhr.

*Example 2*

382.5 grams of acetoacetic acid-p-phenetidide, dissolved in 765 cc. of glacial acetic acid are treated with 135 grams of sodium nitrite as described in Example 1. After adding 2000 cc. of water, the isonitroso compound obtained is isolated by filtering it with suction. The yield is nearly quantitative; melting point 119–120° C.

1000 cc. of aqueous methanol are added to 100 grams of the isonitroso compound and the mixture is hydrogenated at room temperature in the presence of Raney nickel as a catalyst. The catalyst is filtered off and the solution is evaporated to dryness. The remaining residue is purified by dissolving it in dilute hydrochloric acid, filtering it with charcoal and precipitating it with sodium hydroxide solution. After recrystallization from water the α-amino-β-hydroxy-butyric acid-p-phenetidide is obtained having a melting point of 114–115° C.

11.9 grams of α-amino-β-hydroxy-butyric acid-p-phenetidide and 15.55 grams of phenyldimethylpyrazolonmethylaminomethano-sulfonic acid are dissolved in 25 cc. of absolute ethyl alcohol. After filtration ether is added to the solution, whereby a viscous oil precipitates. After the ether has been poured off this oil is dried in order to obtain a foamy white precipitate. 26 grams of phenyldimethylpyrazolonmethylaminomethanesulfonic acid α-amino-β-hydroxy-butyric acid-p-phenetidide are obtained.

The reduction of the α-isonitroso-acetoacetic acid-p-phenetidide can also be carried out in aqueous methanol, at a temperature of 60–70° C., in the presence of a nickel catalyst, applied on kieselguhr.

*Example 3*

500 grams of the isonitroso compound prepared according to Example 2 are diluted with 1500 cc. of glacial acetic acid and 500 cc. of acetic anhydride before introducing, in several portions, 500 grams of zinc dust into the reaction mixture. After stirring the reaction mixture for 1 hour at 30–40° C., 8000 cc. of water are slowly added, while stirring. After stirring for several hours the reaction mixture is filtered with suction, the remaining precipitate is boiled with hot methanol and freed from zinc sludge by filtering with suction. The filtrate is concentrated to a small volume. There remain 465 grams of α-acetyl-amino-acetoacetic acid-p-phenetidide.

3000 cc. of aqueous methanol are added to 465 grams of this compound, and the mixture is hydrogenated at about 60° C. in the presence of Raney nickel. When the reduction is finished, the grey-white magma, after having been warmed, is filtered hot. After cooling, there crystallize from the filtrate 272 grams of α-acetyl-amino-β-hydroxy-butyric acid-p-phenetidide.

250 grams of this acetylamino compound, 250 cc. of water and 250 cc. of concentrated hydrochloric acid are heated for 1 hour on the steam bath. The clear solution is concentrated to a high degree under reduced pressure. The magma-like residue is rendered alkaline by means of a potassium carbonate solution and filtered with suction after having been kept for several hours in the refrigerator. After having been dissolved and allowed to crystallize from hot water, 130 grams of α-amino-β-hydroxy-butyric acid-p-phenetidide are obtained having a melting point of 115° C.

*Example 4*

68 grams of acetoacetic acid-anilide, dissolved in 136 grams of glacial acetic acid, are treated with a solution of 30 grams of sodium nitrite in a little water. After a 15 minutes' stirring, 1 kilogram of ice and 180 grams of concentrated sulfuric acid are added to the solution, whereby the isonitroso compound is precipitated in the form of crystals. After addition of 80 grams of zinc dust to the reaction mixture and stirring for 1 hour, the reaction mixture is filtered with suction. 60 grams of phenylacetic acid chloride and 360 grams of sodium acetate are added to the filtrate. After stirring for 30 minutes, a yellow oil has formed which rapidly solidifies. After some time it is filtered with suction, the solid mass is dissolved in methanol and, after filtration with charcoal, the solution is diluted with water until turbidity sets in. 45 grams of α-phenacetylamino-acetoacetic acid-anilide are obtained having a melting point of 158–160° C.

After hydrogenation with Raney-nickel in aqueous methanol at about 50° C. the product is separated from the catalyst and the filtrate is concentrated. The α-phenacetylamino-acetoacetic acid anilide, melting at 217–218° C. is obtained in nearly theoretical yield.

24 grams of this phenacetylamino compound are boiled for 15 minutes under reflux with 60 cc. of concentrated hydrochloric acid and 60 cc. of water. After cooling, the clear solution is diluted with 200 cc. of water, whereby the phenylacetic acid separates in theoretical yield. After repeated extracting with ether in order to eliminate the phenylacetic acid, concentrated potassium carbonate solution is added to the aqueous solution. The aqueous alkaline solution is repeatedly extracted with ether and, after drying, the ether solution is freed from the solvent. The solid residue of α-amino-β-hydroxy-butyric acid-anilide is dissolved and allowed to crystallize from a mixture of benzene and petroleum ether and melts at 104–105° C.

*Example 5*

A mixture of 28.3 grams of benzoylacetic-acid-p-phenetidide, 85 cc. of methanol and 14 cc. of glacial acetic acid is reacted with a solution of 7 grams of sodium nitrite in a little water. When the introduction of the nitroso group into the reaction mixture is finished, the isonitroso compound is obtained as a rapidly solidifying oil by precipitation with water. After having filtered with suction the comminuted mass, the latter is dissolved in hot methanol in order to be purified and then crystallized by means of water until turbidity sets in. 22.5 grams of α-isonitroso-benzoylacetic acid-p-phenetidide are obtained having a melting point of 180° C.

50 grams of this compound are hydrogenated at about 70° C. in the presence of Raney nickel and 500 cc. of aqueous methanol. After filtering with suction of the catalyst, the filtrate is evaporated to dryness, and the remaining residue is dissolved in dilute hydrochloric acid. After filtration with charcoal and addition of sodium hydroxide solution until it shows an alkaline reaction, a rapidly solidifying oil is obtained. After recrystallization from methanol the α-amino-β-phenyl-propionic acid-p-phenetidide obtained melts at 140–141° C.

By dissolution in the theoretically calculated quantity of hot 1N-hydrochloric acid, filtration with charcoal and cooling, the crystalline hydrochloride, melting at 195–196° C. (decomposition) is obtained.

The reduction of the α-isonitroso-benzoylacetic-acid-p-phenetidide in order to obtain α-amino-β-hydroxy-β-phenyl-propionic acid-p-phenetidide can also be carried out at about 80° C. by hydrogenating in aqueous methanol, 100 grams of the isonitroso compound by means of a nickel catalyst applied on kieselguhr.

*Example 6*

A solution 117.5 grams of acetoacetic acid-N-methyl-p-phenetidide in 235 cc. of glacial acetic acid is treated at 30° C. with a concentrated aqueous solution of 37.5 grams of sodium nitrite. The isonitroso compound crystallizes out after a short while. After an additional stirring of 1 hour and cooling with ice it is filtered with suction. 102 grams of isonitroso aceto-acetic acid-N-methyl-p-phenetidide are obtained having a melting point of 156–157° C.

66 grams of this compound are hydrogenated, at a temperature of 90–95° C., with 500 cc. of methanol of 85% strength in the presence of a nickel catalyst, applied on kieselguhr. After addition of the theoretical amount of hydrogen it is filtered with suction to eliminate the catalyst, and the filtrate is concentrated under reduced pressure to a sirupy consistency. The theoretically necessary quantity of maleic acid, dissolved in double its weight by weight of absolute alcohol is added to the solution consisting of the 60 grams of sirup obtained in 60 cc. of absolute alcohol. After addition of 250 cc. of absolute ether, 71 grams of α-amino-β-hydroxy-butyric acid-N- methyl-p-phenetidide-maleinate are obtained having a melting point of 155° C.

Example 7

64 grams of acetoacetic acid-N-n-butyl-p-anisidide (prepared from N-n-butylanisol and diketene) are treated with 18.5 grams of sodium nitrite as described in Example 6. 55 grams of the isonitroso-compound are obtained, melting at 183–185° C.

The hydrogenation of this isonitroso compound is carried out as described in Example 6. After addition of maleic acid the sirup obtained in the theoretically calculated quantity is converted into the α-amino-β-hydroxy-butyric acid-N-n-butyl-p-anisidide-maleinate melting at 119–120° C.

Example 8

173.5 grams of acetoacetic acid-N-methylanilide (prepared from N-methylaniline and diketene) are treated with 68.5 grams of sodium nitrite as described in Example 6. 163 grams of α-isonitroso-acetoacetic acid-N-methyl-anilide are obtained, melting at 183–184° C.

73 grams of this compound are hydrogenated as described in Example 6. By addition of maleic acid the sirup obtained in theoretically calculated quantity is converted into the α-amino-β-hydroxy-butyric acid-N-methyl-anilide-maleinate melting at 134° C.

Example 9

217.8 grams of acetoacetic acid-N-ethyl-anilide (prepared from N-ethyl-aniline and diketene) are treated with 80 grams of sodium nitrite as described in Example 6. 198 grams of α-isonitroso-acetoacetic-acid-N-ethyl-anilide are obtained melting at 193–194° C.

80 grams of this compound are hydrogenated as described in Example 6. By addition of maleic acid the sirup obtained in theoretically calculated quantity is converted into α-amino-β-hydroxy-butyric acid-N-ethyl-anilide-maleinate melting at 122° C.

Example 10

A solution of 15 grams of acetoacetic acid-1:2:3:4-tetrahydro-6-methoxyquinolide in 300 cc. of glacial acetic acid is treated at about 30° C. with a concentrated aqueous solution of 45 grams of sodium nitrite. The corresponding isonitroso compound crystallizes out after a short time. After stirring for 1 hour and cooling with ice it is filtered with suction. The still moist compound dissolved in 200 cc. of methanol of 85% strength is then hydrogenated at about 90° C. in the presence of a nickel catalyst applied on kieselguhr. After addition of the theoretically calculated amount of hydrogen it is eliminated from the actalyst by filtration, and the filtrate is concentrated to sirupy consistency under reduced pressure. The sirup crystallizes out on cooling, after having been dissolved in warm butyl acetate. 9.4 grams of α-amino-β-hydroxy-butyric acid - 6 - methoxy - 1:2:3:4 - tetrahydroquinolide are obtained melting at 90–91° C.

The acetoacetic acid 1:2:3:4-tetrahydro-6-methoxyquinolide used as starting substance is prepared as follows:

A solution of 311 grams of 6-methoxy-1:2:3:4-tetrahydro-quinoline (preparation according to Beilstein, 4th edition, main work, volume 21, page 61) in 500 cc. of benzene is treated at 40° C. with 200 grams of diketene. After stirring for 1 hour a thick magma has formed. After filtering with suction and washing with benzene 250 grams of acetoacetic acid-1:2:3:4-tetrahydro-6-methoxy-quinolide are obtained melting at 84–85° C.

Example 11

55 grams of acetoacetic acid-(4-phenyl-4-carbethoxy)-piperidide are treated with 13 grams of sodium nitrite as described in Example 10. After addition of water a thick oil deposits which solidifies after eliminating the water and triturating with acetoacetic acid ethyl ester. 52.5 grams of isonitroso-acetoacetic acid-(4-phenyl-carbethoxy)-piperidide are obtained melting at 157–158° C.

The hydrogenation of this compound is carried out as described in Example 10. After concentration of the filtered solution under reduced pressure α-amino-β-hydroxy - butyric - acid - (4 - phenyl - 4 - carbethoxy)-piperidide, melting at 125° C. crystallises out in theoretical yield.

The acetoacetic acid-(4-phenyl-4-carbethoxy)-piperidide used as starting substance is prepared in the following manner:

To a solution of 58 grams of 4-phenyl-4-carbethoxy-piperidine in 120 cc. of benzene 25 grams of diketene are added dropwise at a temperature of 35–40° C. After adding petroleum ether 76 grams of acetoacetic acid-(4-phenyl-4-carbethoxy)-piperidide melting at 95–96° C. crystallize out.

Example 12

A concentrated aqueous solution of 35 grams of sodium nitrite is added to a solution of 124.5 grams of acetoacetic acid-p-carbethoxy-anilide (obtained from p-aminoethyl benzoate and diketene) in 300 cc. of methanol and 70 cc. of glacial acetic acid, whereby a moderate warming takes place. After additional heating to 50° C. the solution is allowed to stand for two hours at room temperature. After addition of water a thick crystalline magma is formed. 130 grams of isonitroso-acetoacetic acid-p-carbethoxy-anilide are obtained melting at 160–161° C.

The hydrogenation is carried out as described in Example 10. The residue obtained after concentration of the filtered solution is extracted with water. After concentration of the aqueous extract and recrystallization from a mixture of ethyl acetate and petroleum ether the α-amino-β-hydroxy-butyric acid-p-carbethoxyanilide is obtained melting at 107–110° C.

We claim:

1. A compound selected from the group consisting of α-amino-β-hydroxy carboxylic acid amides of the general formula

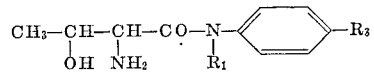

wherein $R_1$ is a member selected from the group consisting of hydrogen and alkyl radicals containing 1 to 4 carbon atoms, and $R_3$ is a member selected from the group consisting of hydrogen, methoxy and ethoxy, and nontoxic acid addition salts of said compounds.

2. α - amino - β - hydroxy - butyric acid - para-phenetidide.

3. α - amino - β - hydroxy - butyric acid - N - methyl-para-phenetidide.

4. α - amino - β - hydroxy butyric acid - N - n - butyl-p-anisidide.

5. α - amino - β - hydroxy - butyric acid - N - ethyl-anilide.

No references cited.